United States Patent
Shotey

Patent Number: 5,243,135
Date of Patent: Sep. 7, 1993

[54] ELECTRICAL OUTLET COVER LOCK

[76] Inventor: Michael J. Shotey, 7733 East Cypress, Scottsdale, Ariz. 85257

[21] Appl. No.: 619,223

[22] Filed: Nov. 28, 1990

[51] Int. Cl.⁵ .................................................. H02G 3/18
[52] U.S. Cl. ..................................... 174/67; 220/210; 220/284
[58] Field of Search ............... 174/67; 220/242, 210, 220/306, 307, 324, 284

[56] References Cited

U.S. PATENT DOCUMENTS

| | | | |
|---|---|---|---|
| 2,510,745 | 6/1950 | Kilgore | 174/48 |
| 2,757,817 | 8/1956 | Egan | 220/3.5 |
| 3,701,451 | 10/1972 | Schindler | 220/27 |
| 4,109,095 | 8/1978 | Kling et al. | 174/67 |
| 4,424,407 | 1/1984 | Barbic | 174/67 |
| 4,505,403 | 3/1985 | Bowden, Jr. et al. | 220/242 |
| 4,593,541 | 6/1986 | Hollis | 174/67 X |
| 4,603,932 | 8/1986 | Heverly | 439/147 |
| 4,605,817 | 8/1986 | Lopez | 174/67 |
| 4,803,307 | 2/1989 | Shotey | 174/67 |
| 4,899,019 | 2/1990 | Riceman | 174/67 |

FOREIGN PATENT DOCUMENTS 644330 7/1962 Canada.

*Primary Examiner*—Lincoln Donovan
*Assistant Examiner*—D. A. Tone
*Attorney, Agent, or Firm*—Streich Lang

[57] ABSTRACT

A tang extends from a cover pivotally attached to a mounting plate of an electrical outlet to interconnect with and lockingly engage a lip extending from the mounting plate. A key, insertable through a keyway in the bottom side of the cover, is used to force the tang upwardly out of engagement with the lip and to unlock the cover from the mounting plate. Subsequent downward pivotal movement of the cover toward the mounting plate will relock the cover.

12 Claims, 1 Drawing Sheet

ELECTRICAL OUTLET COVER LOCK

Background of the Invention

1. Field of the Invention

This invention relates to locking mechanisms for electrical outlet covers and, more particularly, to locking mechanisms for electrical outlet covers locked in place while electrical plugs are plugged into the electrical outlet.

2. Description of the Prior Art

Household electrical outlets are very often situated in outdoor locations to permit homeowners the convenience of plugging in various outdoor electrical appliances, such as electric weed trimmers, sprinkler systems, outdoor lighting, and the like. These outlets are vulnerable to contamination from dirt, water and other foreign matter. Moreover, inflow of water or other liquids may pose an electrical hazard unless the electrical outlets are covered or shielded during both use and nonuse. In commercial establishments, such as kitchens, manufacturing facilities, construction sites, and the like, electrical outlets maybe exposed to liquid chemical compounds, water and/or rain. To avoid the creation of a hazardous situation giving rise to injury or death from electrical shock, covers for the electrical outlets should be used. These covers should protect the electrical outlets both during use and nonuse. U.S. Pat. No. 4,803,307 describes a cover invented by the present inventor for shielding a conventional electrical outlet. This cover is hingedly attached to a plate of the electrical outlet to permit selective access to the electrical outlet. Moreover, the cover accommodates a plugged-in electrical plug(s) and thereby provides weatherproof protection of the electrical outlet during both use and nonuse. Copending United States Patent application entitled "Recessed Electrical Outlet With Cover", Ser. No. 265,262, filed Oct. 31, 1988, now U.S. Pat. No. 4,988,832, describes a flush mounted cover for an electrical outlet which cover was invented by the present inventor. Herein, the electrical outlet is recessed within a wall or similar support structure and the cover is essentially flush with the wall surface or other surface of the unit housing the electrical outlet. This cover accommodates a plugged-in electrical plug(s) and provides weatherproof protection both during use and nonuse of the electrical outlet.

Latches for maintaining covers in place are described and illustrated in the above identified patent and patent application. To prevent unauthorized access to an electrical outlet having a cover or to simply discourage facile access to such an electrical outlet, a lockable mechanism is useful. Such a lockable mechanism must, however, be of relatively low cost, be fabricatable of plastic material during fabrication of the electrical outlet box and cover and it must discourage picking of the lock.

SUMMARY OF THE INVENTION

A lip extends from a face plate attendant an electrical outlet cover, which face plate pivotally supports a cover. The cover includes a flexible tang for lockingly engaging the lip when the cover is in the closed position. A key, insertable through a keyway of the cover, is brought to bear against the tang to flex the tang out of engagement with the lip to unlock the cover from the face plate. The tang may include an aperture in general alignment with the keyway of the cover to discourage manipulation of the tang by a screwdriver, wire or other prod. The key, having a specific structural configuration, will engage the tang rather than slide through the aperture in the tang to permit flexing of the tang. Locking of the cover occurs by the simple act of closing the cover.

It is therefore a primary object of the present invention to provide a key operated lock for securing a cover to an electrical outlet.

Another object of the present invention is to provide a flexible tang for engaging a lip to lock a cover to a face plate of an electrical outlet.

Yet another object of the present invention is to provide a key operated tang for selectively unlocking a cover from a face plate of an electrical outlet.

A further object of the present invention is to provide a configuration for a locking flexible tang formed as part of a lock securing a cover to an electrical outlet face plate to discourage picking of the lock.

A yet further object of the present invention is to provide a lock formed of a tang secured to a cover, which cover pivotally cooperate with a face plate of an electrical outlet, and a lip extending from the face plate.

A still further object of the present invention is to provide an inexpensive lock for locking a cover pivotally attached to a face plate of an electrical outlet.

These and other objects of the present invention will become apparent to those skilled in the art as the description thereof proceeds.

BRIEF DESCRIPTION OF THE DRAWINGS

The present invention will be described with greater clarity and specificity with reference to the following figures, in which.

DESCRIPTION OF THE PREFERRED EMBODIMENT

Figure 1:
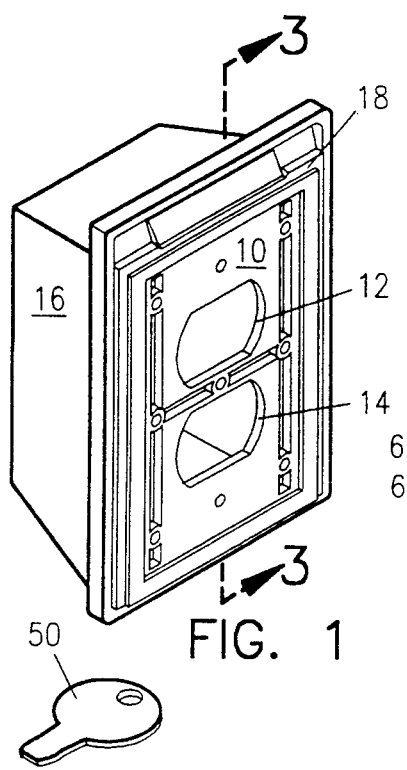
FIG. 1 is a rear quarter view of a face plate of an electrical outlet and supporting a cover for the electrical outlet along with a key useable to unlock the cover from the face plate.

FIG. 1 illustrates a mounting plate 10 attachable to an electrical outlet of conventional configuration. The mounting plate may include apertures 12, 14, for receiving conventional electrical sockets. A cover 16 is pivotally secured to mounting plate 10 by means of a pivot mechanism generally referenced by numeral 18. This pivot mechanism may include any of several different types of pivot means, one of which is shown in the above referenced U.S. Pat. No. 4,803,307.

The function of cover 16 is that of protecting the electrical outlet in a weatherproof manner against dust, debris, rain and other contaminants. Obviously, certain of these contaminants, such as rain or other liquids, could pose an electrical hazard. The cover accommodates a plugged-in plug and thus will provide weatherproof protection whether or not the electrical outlet is in use.

Figure 2:
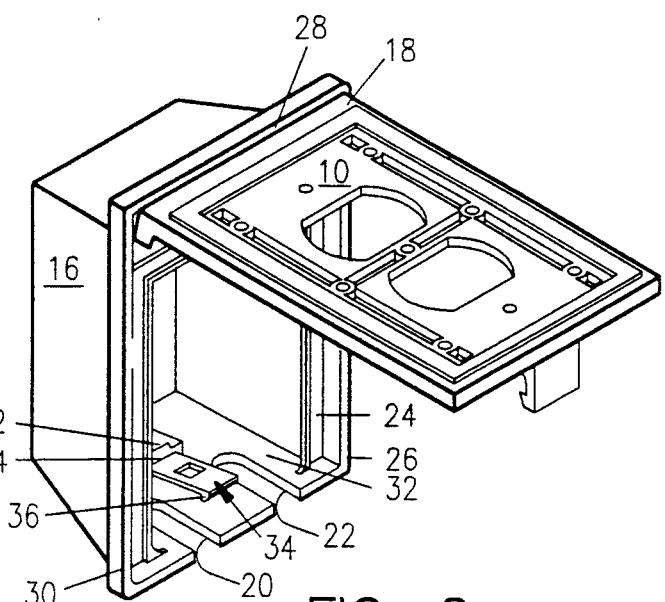
FIG. 2 illustrates the interior of the cover after the cover has been pivoted away from the face plate.

Access to the electrical outlet is provided by upward pivotal movement of cover 16 relative to mounting plate 10 and about pivot mechanism 18, as shown in FIG. 2. For illustrative purposes, the mounting plate is shown as being upwardly pivoted with respect to the cover. It will be evident to those skilled in the art that the mounting plate is fixed relative to the wall surface or other supporting structure for the electrical outlet. However, with the illustration depicted in FIG. 2, the interior of cover 16 is more readily visible and apparent.

Cover 16 includes a pair of slots 20, 22 for accommodating the cords of electrical plugs plugged into the electrical outlet. That is, the cords are disposed within the slots and thereby do not impede closure of cover 16 with respect to mounting plate 10. Seal means 24 may extend about 26, 28 and 30 to form a weatherproof seal with the mounting plate. Usually, such a seal is not required along the lower edge for weatherproofing purpose. Bottom side 32 of the cover includes a flexible tang 34, which tang may be disposed generally between slots 20, 22. The tang includes a downwardly depending shoulder 36.

Figure 3:
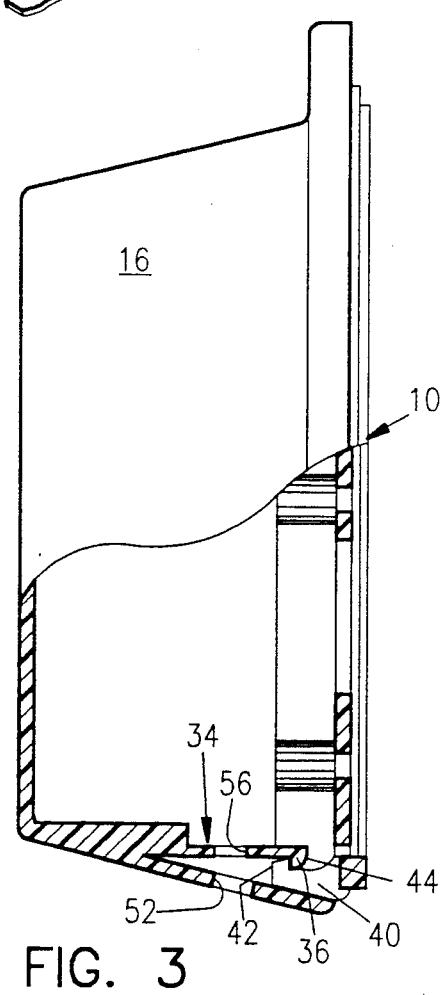
FIG. 3 is a cross sectional view taken along lines 3—3, as shown in FIG. 1.

Referring jointly to FIG. 2 and 3, further details attendant lock mechanism 40 interlocking cover 16 with mounting plate 10 will be described. A lip 42 extends laterally from the lower edge of the mounting plate. Upon closing of cover 16, the lip is engaged by shoulder 36 in response to a downward force exerted by tang 34. The resulting interconnection between lip 42 and shoulder 36 prevents upward (lateral) pivotal movement of cover 16 with respect to mounting plate 10. The end of tang 34 includes a sloping surface 44, which surface defines in part shoulder 36. Upon closing of cover 16, the sloping surface bears against lip 42 and causes the end of the tang to ride upwardly, and over the lip and becomes interlocked therewith.

Figure 4A:
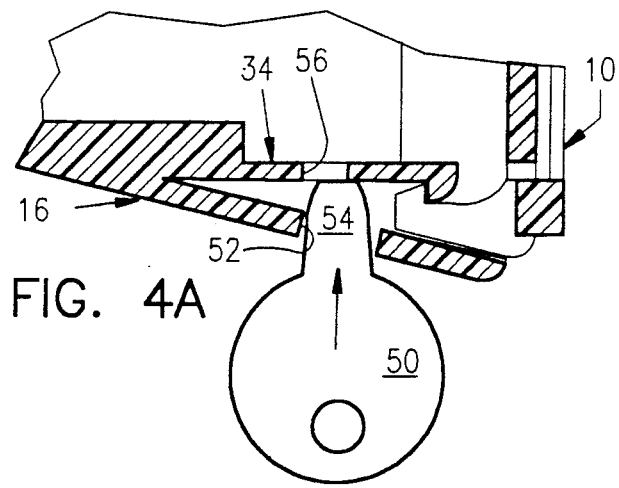
FIG. 4A illustrates initial insertion of a key into the lock securing the cover to the face plate.
Figure 4B:
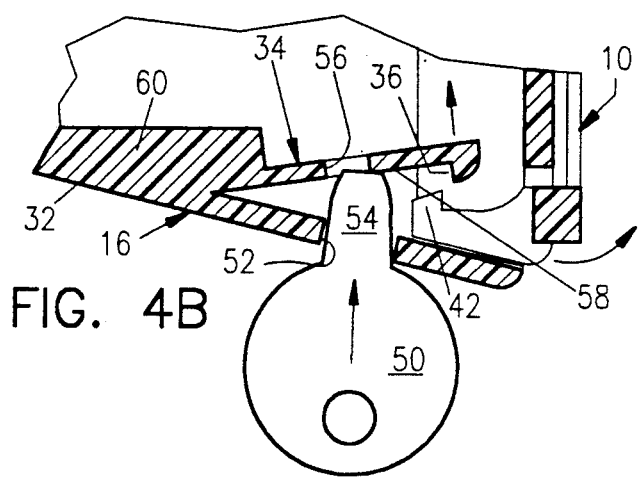
FIG. 4B illustrates unlocking of the cover from the face plate through operation of the key.

To unlock cover 16 from mounting plate 10, a key 50 is used, as depicted in FIGS. 4A and 4B. Key 50 is inserted through a keyway 52 in the bottom side 32 of cover 16 (see also FIG. 3). Upon insertion, prong 54 will bear against the underside of tang 34. Upward pivotal movement of the tang will occur in reponse to further penetrable movement of the prong through keyway 52. The upward movement of tang 34 will result in disengagement between shoulder 36 and lip 42, as particularly depicted in FIG. 4B. Thereafter, cover 16 can be readily pivoted away from mounting plate 10.

To discourage the use of any stick, wire or other thin implement from effecting upward movement of tang 34, an aperture 56 may be formed in tang 34. The aperture is in general alignment with keyway 52 whereby an implement inserted through keyway 52 generally penetrate aperture 56 and prevent forcing tang 34 upwardly. By having prong 54 formed as a thin planar member generally conforming in cross section with keyway 52 to orient the prong, upon insertion, forwardly of aperture 56 along tang 34, the prong engage under surface 58 of the tang. Thereby, the upward force exerted by key 50 will bear against the tang rather than having prong 54 penetrate aperture 56 and be ineffective in raising the tang. It is to be understood that other relatively simple and inexpensive structural configurations may be incorporated to permit selective locking and unlocking of cover 16 with mounting plate 10.

While tang 34 is generally depicted in FIGS. 4A and 4B to extend from an enlarged segment 60 formed as part of bottom side 32 of cover 16, a different configuration may be embodied. For example and as partly shown in FIG. 2, a receiver 62 may be formed upon bottom side 32 to receive and retain end 64 of tang 34. This retention may be temporary or permanent, depending upon the various criteria. Furthermore, the orientation of prong 54 and keyway 52 may be transverse to the keyway shown; slot 56 would be similarly reoriented.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I claim:

1. A locking mechanism operable with a key for controlling access to an electrical outlet, said locking mechanism comprising in combination:
   a) a mounting plate for supporting the electrical outlet;
   b) a cover attached to said mounting plate for covering the electrical outlet;
   c) a flexible tang extending from within said cover;
   d) a lip extending from said mounting plate for engaging said tang upon closure of said cover to lock said cover with said mounting plate;
   e) keyway means disposed in said cover for providing access from outside of said cover to said tang by the key to permit the key to flex said tang to disengage said tang from said lip and unlock said cover from said mounting plate; and
   f) said tang including an aperture generally aligned with said keyway means for accommodating pass-through of an implement other than the key inserted through said keyway means.

2. The locking mechanism as set forth in claim 1 wherein said keyway means orients the key upon insertion of the key to discourage penetration of said aperture by the key.

3. The locking mechanism as set forth in claim 1 wherein the key includes a prong and said keyway means accommodates penetration of the prong to bear against said tang.

4. The locking mechanism as set forth in claim 1 wherein said tang is formed as an integral part of said cover.

5. The locking mechanism as set forth in claim 1 wherein said cover includes a receiver for receiving and retaining a part of said tang to secure said tang with said cover.

6. The locking mechanism as set forth in claim 1 wherein said lip is formed as an integral part of said mounting plate.

7. The locking mechanism as set forth in claim 1 including means for pivotally attaching said cover to said mounting plate to repetitively guide said tang into engagement with said lip.

8. The locking mechanism as set forth in claim 1 wherein said tang includes a shoulder for lockingly engaging said lip.

9. The locking mechanism as set forth in claim 8 wherein said tang includes a sloping surface for relocating said shoulder to lockingly engage said lip.

10. The locking mechanism as set forth in claim 1 wherein said keyway means includes means for orienting the key into nonalignment with said aperture upon insertion of the key into said keyway means.

11. The locking mechanism as set forth in claim 1 wherein said keyway means comprises a slot.

12. The locking mechanism as set forth in claim 11 wherein the key includes a thin planar prong and wherein said slot is dimensioned to penetrably receive the prong.

* * * * *